(12) United States Patent
Lee

(10) Patent No.: US 9,837,831 B2
(45) Date of Patent: Dec. 5, 2017

(54) CLASS E COIL DRIVER WITH SWITCHED CAPACITOR ASK MODULATION

(71) Applicant: ALFRED E. MANN FOUNDATION FOR SCIENTIFIC RESEARCH, Santa Clarita, CA (US)

(72) Inventor: Edward K. F. Lee, Fullerton, CA (US)

(73) Assignee: The Alfred E. Mann Foundation For Scientific Research, Santa Clarita, CA (US)

( * ) Notice: Subject to any disclaimer, the term of this patent is extended or adjusted under 35 U.S.C. 154(b) by 218 days.

(21) Appl. No.: 14/698,729

(22) Filed: Apr. 28, 2015

(65) Prior Publication Data
US 2015/0318712 A1 Nov. 5, 2015

Related U.S. Application Data

(63) Continuation-in-part of application No. 14/631,627, filed as application No. PCT/US2013/057592 on Aug. 30, 2013.

(60) Provisional application No. 61/986,359, filed on Apr. 30, 2014, provisional application No. 61/695,815, filed on Aug. 31, 2012.

(51) Int. Cl.
| | |
|---|---|
| H01F 27/42 | (2006.01) |
| H01F 37/00 | (2006.01) |
| H01F 38/00 | (2006.01) |
| H02J 5/00 | (2016.01) |
| H02M 3/335 | (2006.01) |
| H02J 17/00 | (2006.01) |
| H01F 38/14 | (2006.01) |

(52) U.S. Cl.
CPC ............. *H02J 5/005* (2013.01); *H02J 17/00* (2013.01); *H02M 3/33507* (2013.01); *H01F 38/14* (2013.01)

(58) Field of Classification Search
USPC .................................................. 307/104, 107
See application file for complete search history.

(56) References Cited

U.S. PATENT DOCUMENTS

| | | | | |
|---|---|---|---|---|
| 8,450,991 B2* | 5/2013 | Runas | ................ | H03K 19/0019 323/280 |
| 8,886,970 B2* | 11/2014 | Huynh | ...................... | G06F 1/26 370/212 |
| 8,892,914 B2* | 11/2014 | Huynh | ...................... | G06F 1/26 713/300 |

(Continued)

OTHER PUBLICATIONS

Lee, E. A feedback controlled coil driver for transcutaneous power transmission, Proc. IEEE CICC, 2012, pp. 1-4.

(Continued)

*Primary Examiner* — Adam Houston
(74) *Attorney, Agent, or Firm* — Cameron A. Cushman

(57) ABSTRACT

A feedback controlled coil driver with ASK modulation is disclosed. A class E coil driver drives an LC circuit to generate a magnetic signal via the inductor. A modulation capacitor is coupled to the LC circuit to modulate the coil driver signal. The voltage across the coil driver switch is sampled. The difference between the sampled voltage and a reference voltage is integrated and compared to a ramp voltage to obtain an optimal on time for the coil driver switch such that coil current is maximized.

31 Claims, 10 Drawing Sheets

(56) References Cited

U.S. PATENT DOCUMENTS

| | | | | |
|---|---|---|---|---|
| 8,898,491 | B2* | 11/2014 | Huynh | G06F 1/26 |
| | | | | 370/212 |
| 9,041,254 | B2* | 5/2015 | Lisuwandi | H02J 5/005 |
| | | | | 307/104 |
| 9,083,198 | B2* | 7/2015 | Sutarwala | H02J 5/005 |
| 9,362,763 | B2* | 6/2016 | Chuang | H02J 7/0036 |
| 9,444,279 | B1* | 9/2016 | Brown | H02J 7/0047 |
| 9,478,991 | B2* | 10/2016 | Weissentern | H02J 5/005 |
| 2015/0318712 | A1* | 11/2015 | Lee | H02J 17/00 |
| | | | | 307/104 |

OTHER PUBLICATIONS

Ramrkhyani, A., et al, Design and optimization of resonance-based efficient wireless power delivery systems for biomedical implants, IEEE Trans. on Bio. Cir. & Syst., 2011, vol. 5, No. 1, pp. 48-63.
Ricketts, D., et al, On the efficient wireless power transfer in resonant multi-receiver systems, Proc. IEEE Int. Symp. on Cir. & Syst., May 2013, pp. 2779-2782.

* cited by examiner

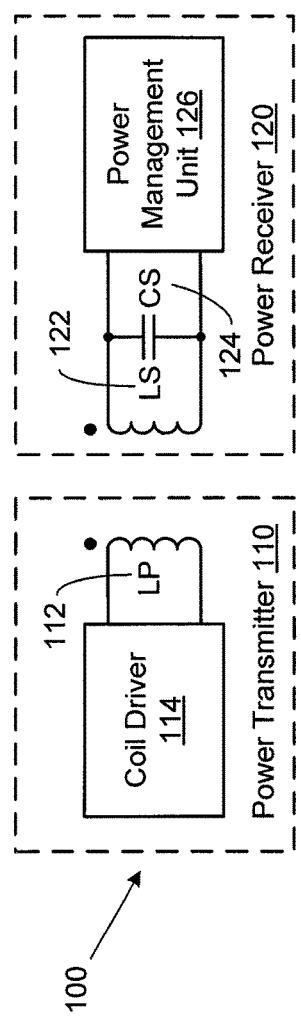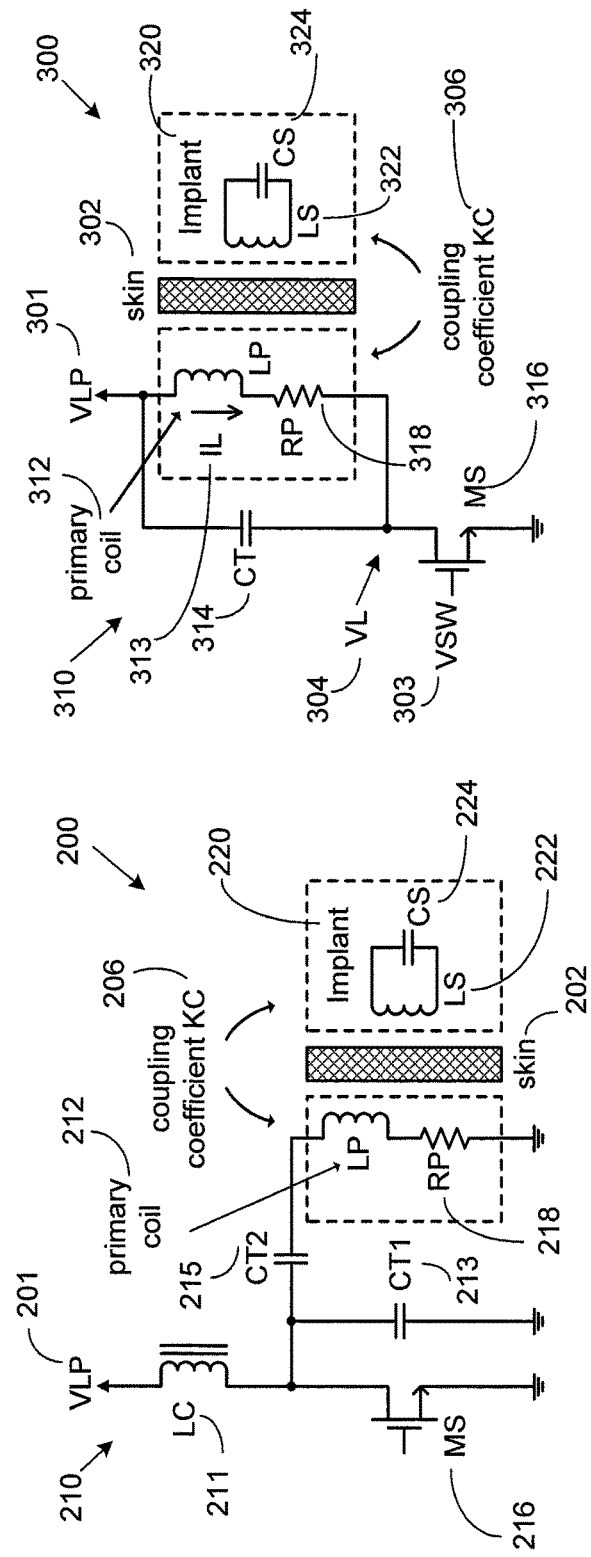
FIG. 1 PRIOR ART
FIG. 2 PRIOR ART
FIG. 3

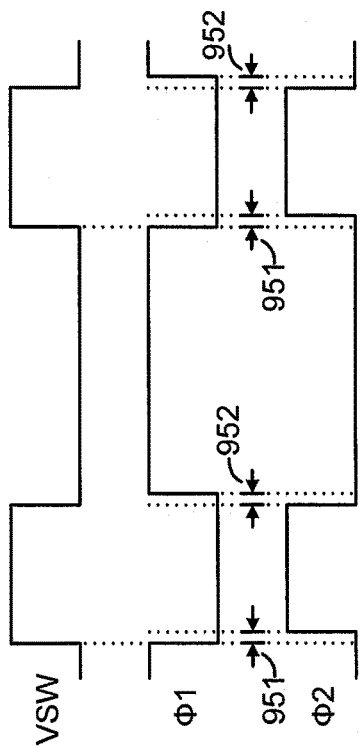
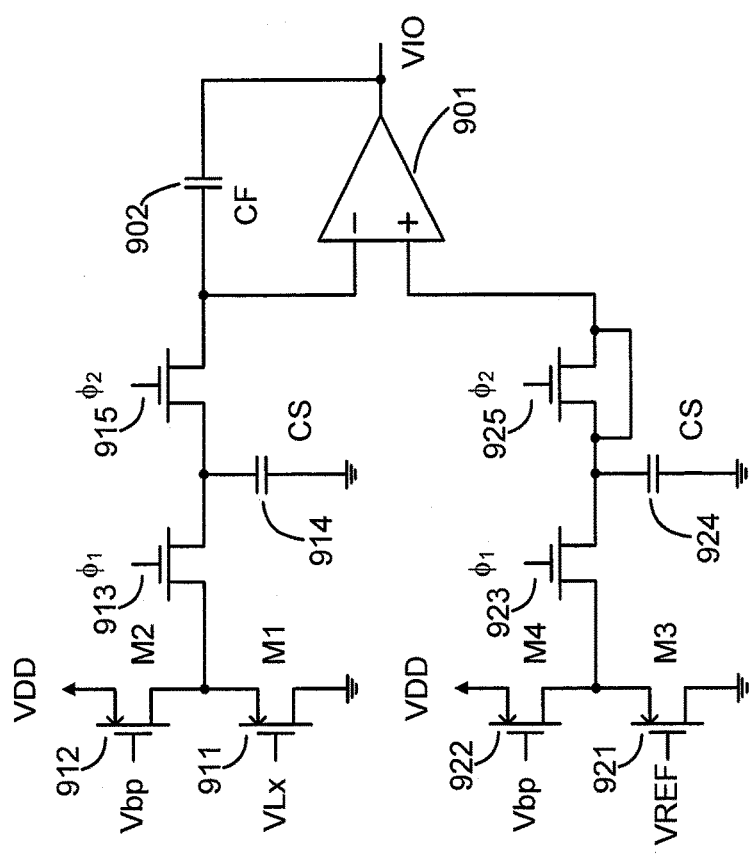
FIG. 9B
FIG. 9A

CLASS E COIL DRIVER WITH SWITCHED CAPACITOR ASK MODULATION

CROSS REFERENCE TO RELATED APPLICATIONS

The present application claims the benefit under 35 U.S.C. §119(e) to U.S. Provisional Application No. 61/986,359, filed on Apr. 30, 2015, which is incorporated herein by reference in its entirety. The present application is a continuation in part of U.S. application Ser. No. 14/631,627, filed on Feb. 25, 2015, which was a US national stage filing of international application No. PCT/US2013/057592, filed on Aug. 30, 2013, which claims the benefit of U.S. provisional application No. 61/695,815, filed on Aug. 31, 2012, all of which are hereby incorporated by reference herein.

BACKGROUND OF THE INVENTION

Inductive power transfer or transmission is frequently used to deliver power wirelessly to portable electronic devices. Wireless power transfer is used in a variety of applications, such as, for recharging the batteries in portable devices, such as smart phones, tablets and laptops. Such power transfer systems are also used to transmit power transcutaneously, i.e., through the skin, to implanted medical devices, to either power an implant directly or to recharge the implant's battery.

As shown in FIG. 1, a conventional power transfer system 100 typically includes a coil driver 114 driving a primary coil LP (112), which inductively couples and powers secondary coil, LS (122) located inside electronic device 120. Various transcutaneous power transfer systems are described in: W. Loke, et al., "A 0.5V sub-mW wireless magnetic tracking transponder for radiation therapy," Sym. on VLSI Cir., pp. 172-173, 2011; Y. Liao, et al., "A 3 µW wireless powered CMOS glucose sensor for an active contact lens," ISSCC Dig. Tech. papers, pp. 38-39, 2011 and S. Lee, et al., "A low-power bidirectional telemetry device with a near-field charging feature for a cardiac microstimulator," IEEE Tran. Bio. Cir. Syst., vol. 5, pp. 357-367, August, 2011. Although some implants are designed to obtain power directly from the batteries within the implants, those batteries that are rechargeable still have to be recharged wirelessly by an external power transmitter. See E. Lee, et al., "A biomedical implantable FES battery-powered micro-stimulator," IEEE Tran. Cir. Syst. I, vol. 56, pp. 2583-2596, December 2009. In recent developments, many efforts have been devoted to improve the power reception and the power management within the implants. See, for example, H. Lee and M. Ghovanloo, "Fully integrated power efficient AC-to-DC converter design in inductively powered biomedical applications," Proc. of IEEE 2011 CICC, paper 8.7, 2011. However, the coil driver in an external transmitter still requires a lot of discrete components. See the article by S. Lee, et al., 2011 cited above and also G. Kendir, et al., "An optimal design methodology for inductive power link with class-E amplifier," IEEE Tran. Cir. Syst. I, vol. 52, pp. 857-866, May, 2005.

Class E amplifier type systems 210 as shown in FIG. 2 are commonly used in coil driver designs, See S. Lee, et al., 2011 and G. Kendir, et al., 2005 cited above. In addition to discrete capacitors CT1 (213) and CT2 (215), a bulky RF choke LC (211) is also required in this circuit topology. Since a power transmitter is normally part of a patient's external controller for an implanted medical device 220, it is important for the external controller to be small and lightweight. Therefore, a coil driver for such a wireless power transfer system should use a minimal number of discrete components to achieve a small size and should have low power consumption such that only a small battery is required.

SUMMARY OF THE INVENTION

The invention deals with a design for a feedback controlled coil driver that achieves an optimum coil driver switch "on time". The coil is part of an LC tank circuit and the optimum coil driver switch "on time" is achievable for different operating frequencies without the need for adjusting the values of the inductance and capacitance of the LC tank circuit. The optimum coil driver switch "on time" further results in a maximized value of the ratio of the square of the peak to peak coil current to the power delivered by a LC tank circuit power supply. In a coil driver system embodying the principles of the invention, a capacitor is coupled into the coil circuit to modulate the power signal, and the feedback control of the coil driver switch "on time" results in a reduced amplitude power signal when the capacitor is coupled into the coil circuit. The result is a system which does not dissipate power on series elements during ASK modulation, reducing the power consumption of the driver circuit.

The optimum coil driver switch "on time" is obtained by switchably coupling the LC tank circuit between a power supply and ground at controlled times. A sample and hold circuit monitors the LC tank circuit output voltage and an integrator circuit integrates the difference between the output voltage and a prescribed reference voltage which is typically set to zero volts. One of many unique attributes of the present invention is that a ramp voltage is generated at the time the LC tank circuit is coupled to ground which is then compared to the output of the integrator circuit. The coil driver switch decouples the LC tank circuit from ground when the value of the ramp voltage exceeds the value of the integrated difference voltage.

A repetitive pulse signal generator provides a pulse train to the coil driver switch at a predetermined frequency. Each pulse of the pulse train has a start time and a pulse width ("on time") which is controlled by the feedback loop as described above which causes the "on time" to be optimized with the identified benefits and advantages.

BRIEF DESCRIPTION OF THE DRAWINGS

FIG. 1 is a block diagram of a power transfer system for an electronic device.

FIG. 2 is a block diagram of a power transfer system using a prior art coil driver based on a class E amplifier.

FIG. 3 is a block diagram of a power transfer system using a coil driver based on a resonant DC-AC converter topology.

FIG. 9A is an exemplary embodiment of the error detection circuitry of FIG. 8.

FIG. 9B is a timing diagram of an exemplary embodiment of the signals used in the circuit of FIG. 9A.

DETAILED DESCRIPTION

FIG. 3 is a block diagram of a power transfer system 300 using a coil driver 310 based on resonant DC-AC converter topology. See N. Mohan, T. Undeland and W. Robbins, Power electronics: converters, applications, and design, John Wiley & Sons, 2003 and also M. Paemel, "High-efficiency transfer for medical implants," IEEE Solid-State Cir. Mag., vol. 3, pp. 47-59, 2011 for more information on resonant DC-AC converter design. Primary coil LP (312) and discrete capacitor CT (314) form a resonant LC tank circuit for transmitting power to the secondary coil LS (322) in implant 320. One possible operating frequency FO, for such an inductive link is at about 120 kHz. See E. Lee, et al., "A biomedical implantable FES battery-powered microstimulator," IEEE Tran. Cir. Syst. I, vol. 56, pp. 2583-2596, December 2009. For higher operating frequencies (e.g., 13.56 MHz), capacitor CT (314) can be potentially integrated on-chip for further component reduction.

As will be discussed with respect to FIGS. 4A-4D and 5A-5B, a feedback loop minimizes the power dissipation on coil driver 310 by controlling the "on time" (TON) of switch MS (316). Coil driver 310 is also capable of providing amplitude shift keying (ASK) modulation on the power transfer since, in some applications, data is sent from the external controller to an implant via the same inductive link. See, for example S. Lee, et al., 2011 cited above and also R. Sarpeshkar, Ultra low power bioelectronics: fundamentals, biomedical applications, and bio-inspired systems, Cambridge University Press, 2010.

The operating frequency FO of coil driver 310 is derived from an input clock frequency, FCLOCK, where, for the current application, FCLOCK=20×FO. For proper operation of coil driver 310, capacitor CT (314) is selected such that the resonant frequency of primary coil LP (312) and CT (314) is FLC=½π/(LP×CT)$^{0.5}$ is greater than FO, (See M. Paemel, "High-efficiency transmission for medical implants," IEEE Solid-State Cir. Mag., vol. 3, pp. 47-59, 2011). Due to the physical sizes and the location constraints of the coils in an implant and an external controller, the coupling coefficient KC (306) and the Q factors of the coils are relatively small in these types of systems. Hence, the power efficiency of the inductive coupling is also low.

Figure 4A:
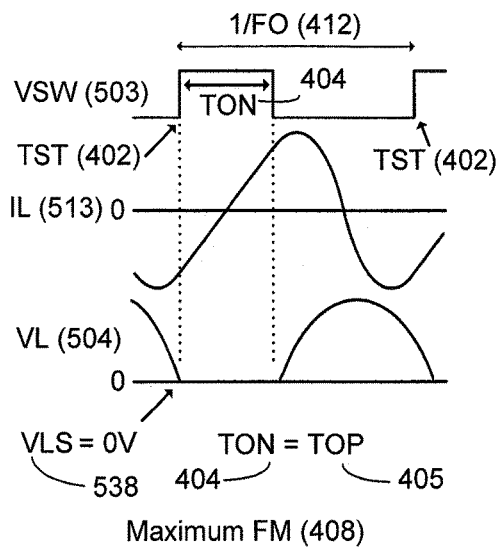
FIGS. 4A-4D are timing waveforms for various values of on times for a switch for a coil driver, according to an embodiment of the present invention.

To maximize the power transfer to secondary coil LS (322), the current on primary coil LP (312) in FIG. 3, given as primary coil current IL (313), must be maximized for a given power delivery from the primary coil supply voltage VLP (301), (See R. Sarpeshkar, 2012 cited above). Primary coil current IL (313) is generated by turning on, at controlled times, switch MS (316) such that primary coil LP (312) is energized by supply voltage VLP (301). When switch MS (316) is off, primary coil LP (312) and capacitor CT (314) are decoupled from ground and will resonate, producing a sinusoidal primary coil current IL (313) until switch MS (316) is turned on again in the next cycle, as shown in FIG. 4A. For a given power PLP, from supply voltage VLP (316), the peak to peak value of primary coil current IL given as ILP-P is maximized by controlling the on time TON (404), for switch MS (316) so that switch MS (316) only allows current flow when the coil driver output voltage VL (304) across switch MS (316), reaches exactly 0V and remains essentially 0V during the duration of on time TON (404). In this case, the power dissipation by switch MS (316) is minimized and the turn on time TON (404) will be equal to the optimal on time given as TOP (405) and the following condition, as shown in equation (1) below, will be satisfied, $$\frac{FLC}{FO} = \frac{1}{1 - FO \times TOP}\left(\frac{1}{2} + \frac{1}{\pi}\arctan\frac{1}{\pi FLC \times TOP}\right) \quad (1)$$

The maximum value of coil driver output voltage VL (304) across switch MS (316), VLMAX, and the peak to peak primary coil current ILP-P can be written as:

$$VLMAX = VLP(1 + 1/\sin\theta) \quad (2)$$

$$ILP - P = \frac{VLP \times TOP}{LP \times \cos\theta} \quad (3)$$

where θ=arctan [2/TOP·(CT·LP)$^{0.5}$].

A figure of merit, FM (408), defined as FO·LP·ILP-P$^2$/PLP will be used to measure the effectiveness of generating primary coil current IL, when the on time TON the optimal on time TOP, then FM will be maximized. For a given operating frequency FO, manual adjustments on primary coil LP, capacitor CT or on time TON are often required to maximize the power transfer to an implant, (See S. Lee, et al., 2011 and R. Sarpeshkar, 2010 cited above). The impedance of primary coil LP (312), and hence, the resonant frequency of primary coil LP (312) and capacitor CT (314), may deviate from the nominal value after manual adjustments when primary coil LP (312) is near any metallic objects or an implant that has large coupling coefficients (KC>0.1) with primary coil LP (312) (See R. Sarpeshkar, 2010 cited above). The present invention provides an automatic adjustment scheme to achieve optimal on time TOP for primary coil LP (312).

FIG. 4A-4D are timing waveforms for various values of on times TON (404) for switch MS (516) for coil driver 500. FIGS. 4A-4D show four timing waveforms: voltage VSW (503) applied to switch MS (516), coil current IL (513) and coil driver output voltage VL (504) for various values of on time TON (404) in relation to an optimal on time TOP (405). During each cycle 1/FO (412) of voltage VSW (503) applied to switch MS (516), turn on time TON (404) begins at turn on start time TST (402). Voltage VSW (503) applied to switch MS (516) is a repetitive pulse signal with a frequency equal to the operating frequency FO.

Figure 4B:
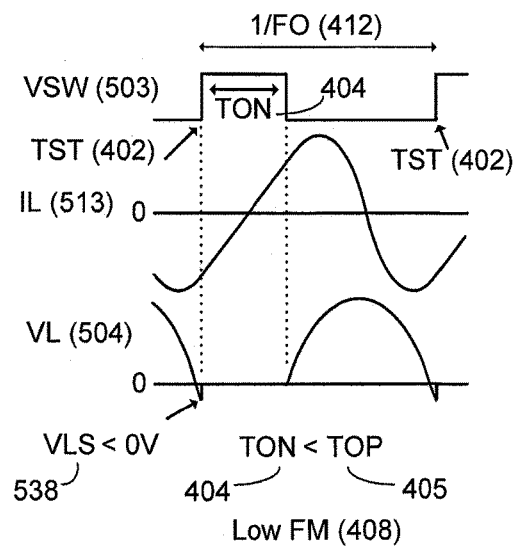
Figure 4C:
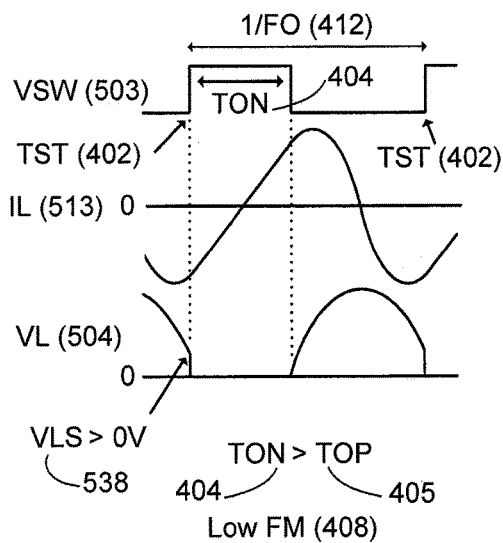
Figure 4D:
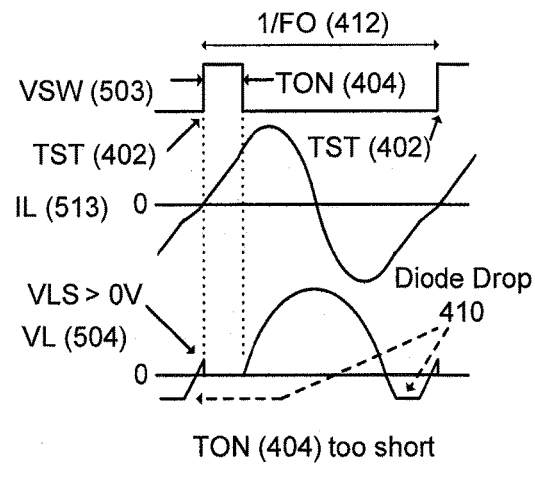
Figures 5A, 5B:
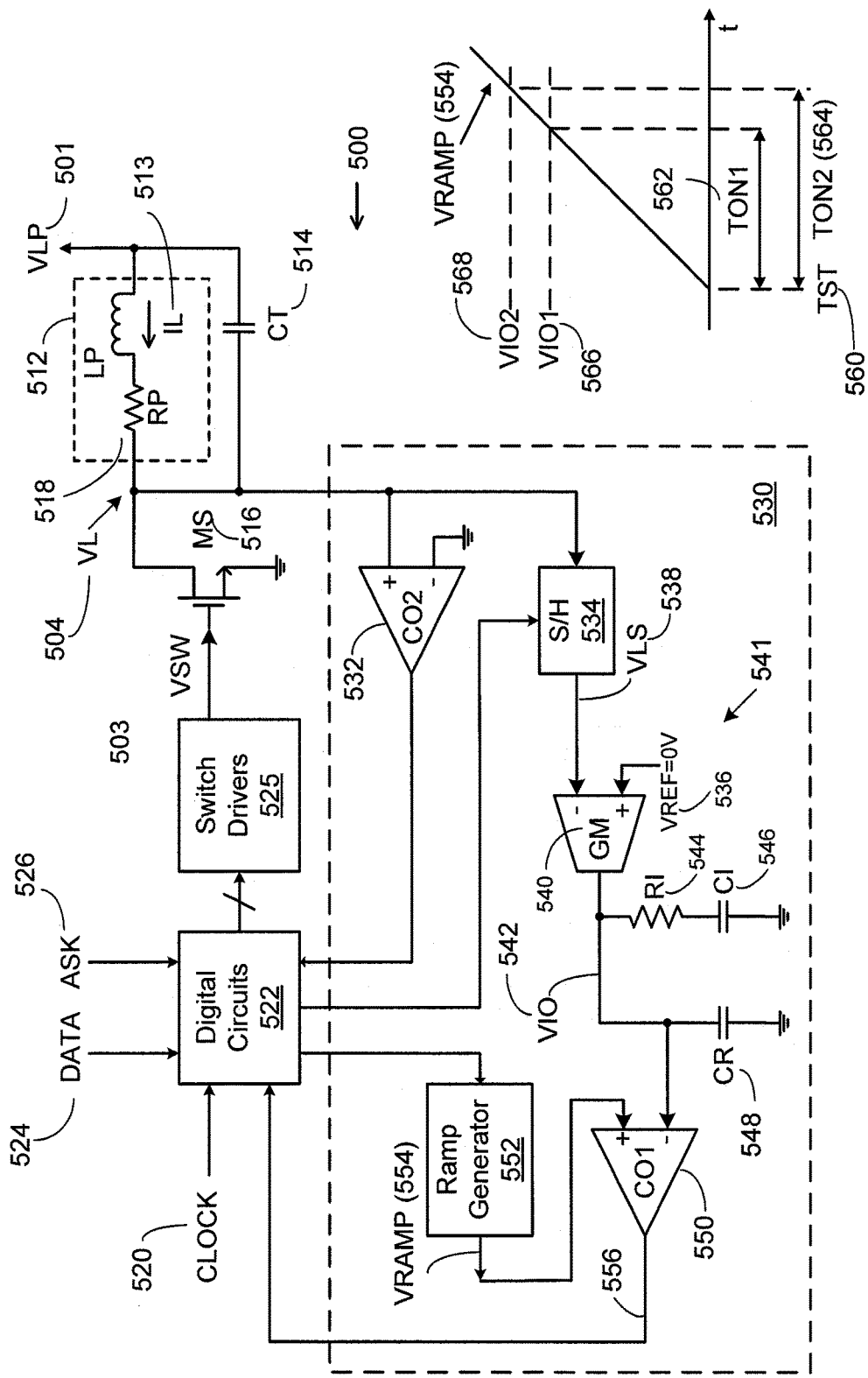
FIG. 5A is a block diagram of a feedback controlled coil driver according to an embodiment of the present invention.
FIG. 5B is a timing waveform for the output of the ramp generator in FIG. 5A.

FIG. 5A is a block diagram of a feedback controlled coil driver 500 according to an embodiment of the present invention. FIG. 5B is a timing waveform for the output of the ramp generator 552 in FIG. 5A. Primary coil LP (512) and capacitor CT (514) form an LC tank circuit for power transfer to a secondary coil, which is not shown in FIG. 5A. In the present invention, a feedback controlled technique is used to achieve optimal on time TOP (504) automatically. A sample and hold circuit S/H (534) is used to sample the coil driver output voltage VL (504) across switch MS (516) at the instant switch MS (516) is turned on. This instant is denoted as turn on start time TST (402) and the sampled voltage of coil driver output VL (504) at turn on start time TST is denoted as VLS (538) as shown in FIGS. 4A-4D and 5A. VL will transition to 0 once MS is turned on, so when this application refers to sampling VL "at the instant switch MS is turned on" or equivalents, it means capturing the value of VL before it transitioned to 0. The difference between the sampled voltage VLS (538) and the reference voltage VREF (536), which represents an error voltage VER (not shown), is integrated by integrator 541 comprised of transconductor GM (540) and capacitor CI (546) to produce the integral over time of VER designated as voltage VIO in FIG. 5A. To achieve on time TON equal to optimal on time TOP, reference voltage VREF (536) is set to 0V. The feedback loop for controlling MS (516) is to have coil driver output voltage VL (504) equal to zero when MS (516) starts to turn on. VL (504) is compared to VREF (536) after it is sampled at the instant when MS (516) starts to turn on. This comparison drives the on time in the right direction until VL (504) equals VREF (536). With VREF equal to zero, VL will be driven to zero in steady state and the optimum on time TON will be achieved. The integrator 541 output voltage VIO (542), is used as a threshold for comparator CO1 (550). On time TON (404) is determined by the output of comparator CO1 (550), ramp generator 552 and the value of VIO (542). When switch MS (516) turns on at turn on start time TST (402), ramp generator 552 begins to produce ramp voltage VRAMP (554) shown in FIG. 5B. When VRAMP is greater than VIO, comparator CO1 (550) will signal digital circuit 522 to turn off switch MS (516) via control signal 556. Therefore, on time TON (404) is the time taken from TST (402) to the instant when comparator CO1 (550) causes MS (516) to turn off. Digital circuits 522 include a repetitive pulse signal generator to provide a pulse train VSW (503) to coil driver switch MS (516) at operating frequency FO. Each pulse of pulse train VSW (503) has turn on start time TST (402) and a pulse width ("on time") TON (404) which is controlled by feedback controller 530 via control signal 556.

FIG. 5B illustrates the influence of the value of VIO on the switch on time TON. For example, for a VIO value of VIO1, the corresponding on time is TON1 and for a VIO value of VIO2, the corresponding on time is TON2. Since the signal appearing at the output of integrator 541 is greater at VIO2 than at VIO1, the switch on time TON2 will be longer than the on time TON1. The slope of the VRAMP (554) signal is fixed by the ramp generator (552), but can be adjusted to establish speed of feedback response. The maximum value of ramp voltage VRAMP (544) during any one cycle of operating frequency FO is less than or equal to the supply voltage of ramp generator 552. Accordingly, sample and hold circuit S/H (534), integrator 541, ramp generator 552 and comparator CO1 (550) may, in combination, be considered a feedback controller for providing a control signal 556 for controlling the on time of switch MS (516). The control signal comprises the integral of the difference between the sampled output voltage VLS and VREF as influenced by the ramp voltage VRAMP (554) in comparator CO1. For on time TON less than optimal on time TOP, sampled voltage VLS (538) and therefore error voltage VER, will be less than 0V as shown in FIG. 4B. Integrator 541 will drive voltage VIO (542) to a higher value, resulting in a longer on time TON.

For on time TON greater than optimal on time TOP, sampled voltage VLS will be greater than 0V as shown in FIG. 4C. Integrator 541 output voltage VIO (542) will be driven to a lower value resulting in a shorter on time TON. In steady state, the feedback loop will drive sampled voltage VLS (538) to the value of the reference voltage VREF (536) and as a result, the error voltage VER=0V and voltage VIO (542) will remain constant. At that point, TON (404) is at its optimal value and equal to TOP (405) for VREF=0V. Even if the value of primary coil LP (512) deviates from the nominal value due to a nearby metallic object, the feedback loop will adjust TON (404) according to sampled voltage VLS (538) until VLS=0V and the optimal on time TOP (405) is achieved. Resistor RI (544) and capacitor CR (548) are added to the feedback loop for respective stability compensation and ripple reduction on voltage VIO (542).

In cases where on time TON (404) is too short during power up, the coil driver output voltage VL (504) across switch MS (516) will go negative and turn on the parasitic diode of switch MS (516) before switch MS (516) turns on at turn on start time TST as shown in FIG. 4D. Primary coil LP (512) will be charged through the parasitic diode of switch MS (516) and coil driver output voltage VL (504) may even begin to increase before switch MS (516) turns on at turn on start time TST, resulting in a positive sampled voltage VLS (538). The feedback loop may incorrectly interpret that on time TON is too long and proceed to reduce it further, eventually complete turning off switch MS (516). As a consequence, primary coil LP (512) will be recharged solely by the parasitic diode and coil driver 500 will operate at a frequency different from the operating frequency FO. In addition, the driver will have a very low figure of merit FM. This condition can be avoided by ensuring a minimum pulse width for TON and by adding a comparator CO2 (532) as shown in FIG. 5A.

When the voltage across switch MS (516), VL is less than 0V, comparator CO2 (532) will signal the sample and hold S/H (534) to sample voltage VL (504) at the next clock (520) cycle even before turn on start time TST. Hence, the sampled voltage VLS will be less than 0V such that integrator 541 will drive its output voltage VIO (542) to a higher value leading to a longer on time TON and ultimately, an optimal on time TOP in steady state.

The power transfer level of coil driver 500 can be controlled by adjusting the coil supply voltage VLP (501) without affecting on time TON since the peak to peak primary coil current ILP-P is directly proportional to supply voltage VLP (501) according to Eq. (3).

Figure 6:
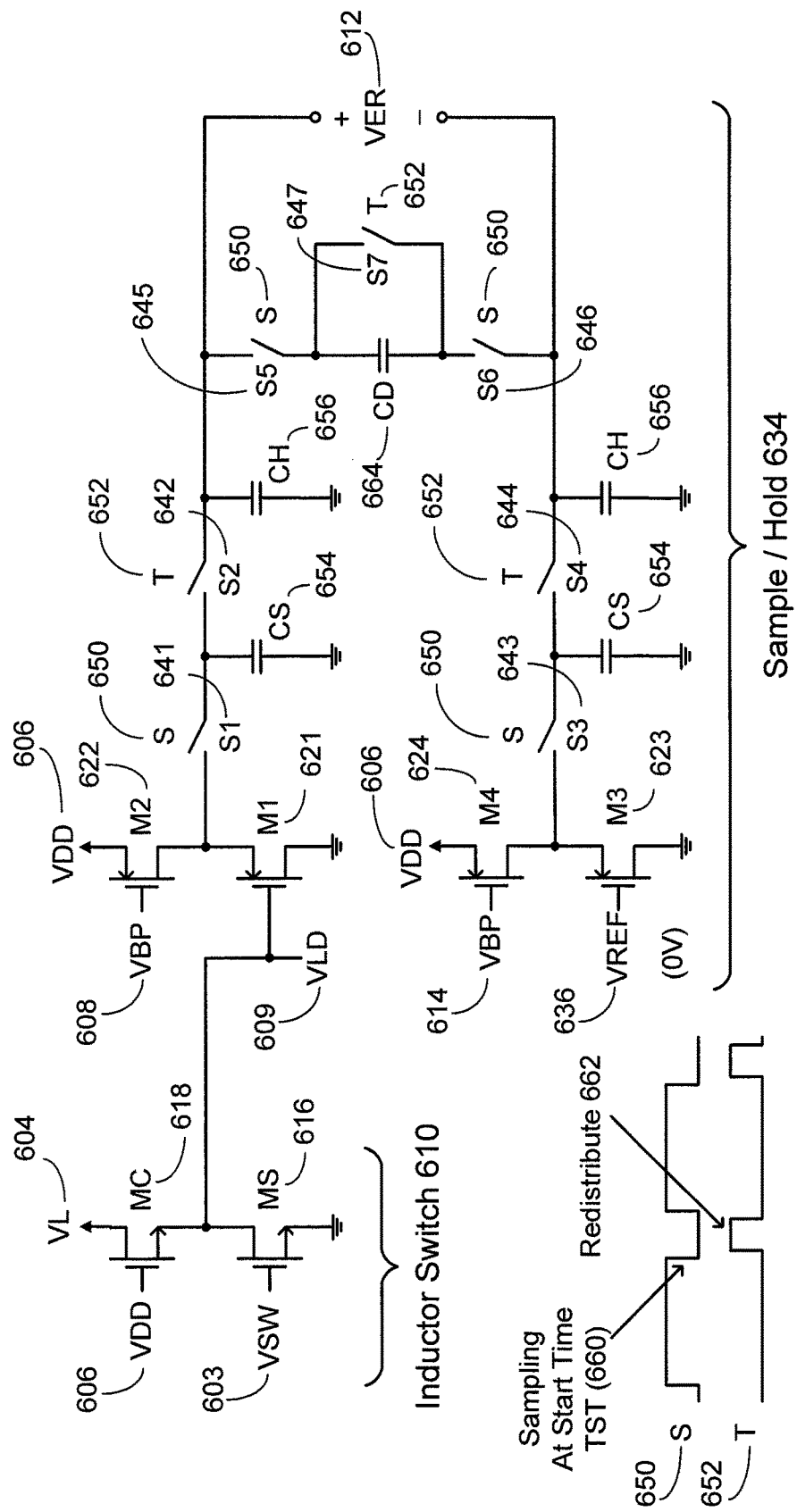
FIG. 6 is an exemplary schematic of the inductor switch and sample and hold of FIG. 5A.

FIG. 6 is a schematic of an exemplary implementation of the inductor switch MS (516) and sample and hold S/H (534) of FIG. 5A. For example, if a 5V 0.8 µm CMOS process is used to implement coil driver 500, the VGS's and the VDS's of the MOSFETs will be limited to ~5V and ~12V, respectively. According to Eq. (2), the coil driver output voltage VL (604) across inductor switch 610 in this example can go up to ~15V for a supply voltage VLP=5V. To accommodate the required high VDS for switch MS (616), a MOSFET transistor MC (618) is added in series to switch MS (616) as shown in FIG. 6. The drain voltage of switch MS (616), denoted by VLD (609), is now limited to <5V for VDD=5V, and the VDS of transistor MC (618) will be limited to <12V. Since large transistor sizes are needed for transistor MC (618) and switch MS (616) to minimize the overall on resistance, the voltage VL (604) is approximately equal to VLD (609) for VL essentially equal to 0V.

Instead of sampling coil driver output voltage VL (604) directly, sample voltage VLS can be obtained by sampling VLD (609), which has a lower voltage swing that is less than VDD. Therefore, the input of the sample and hold S/H (534) does not need to have high voltage tolerance. Since voltages VL (604) and VLD (609) can also go below 0V as shown in FIG. 4B and FIG. 4D, MOSFETs M1-M2 (621, 622) are used as a level shifter as well as a buffer to prevent charge leakage from sampling capacitor CS (654) to VLD (609) via the parasitic NPN associated with switch S1 (641). A similar circuit arrangement is used for the reference voltage input VREF (636) to match the VLD (609) voltage input. After the voltage VL (604) is sampled, the charges on sampling capacitors CS (654) redistribute to the holding capacitors CH (656). The voltage difference between holding capacitors CH (656) represents the voltage difference between VLD (609) and VREF (636), or VER (612). However, this operation also introduces an extra pole in the feedback loop. This extra pole is compensated using a switched capacitor CD (664), which allows better control on the DC gain as well as the pole location of the sample and hold S/H (634) for achieving overall stability of coil driver 500. Switches S1-S7 inside sample and hold S/H (634) are controlled by two non-overlapping clock signals—S (650) and T (652). Signal S controls switches S1, S3, S5 and S6. Signal T controls switches S2, S4 and S7. For the other circuits including transconductor GM (540), comparators CO1 (550) and CO2 (532), conventional circuit design techniques can be used.

As discussed previously, coil driver 500 is also designed for sending data to an implant using ASK modulation. A low modulation index in the range between 5% and 25% can be used for such implants. Although ASK modulation on primary coil current IL (513) can be achieved by modulating the coil supply VLP (501) according to the digital input DATA (524), a complicated hybrid amplifier for fast settling can be required to drive supply voltage VLP (501) (See, for example, Y. Wu and P. Mok, "A two-phase switching hybrid supply modulator for polar transmitters with 9% efficiency improvement," ISSCC Dig. Tech. papers, pp. 196-197, 2010).

A simpler scheme that does not require any additional discrete components to achieve ASK modulation can be used. It is based on changing the size of switch MS (516) according to digital input DATA. For DATA=1, the size of switch MS (516) remains nominal and the amplitude of primary coil current IL is the amplitude during the normal power transfer operation discussed above. For DATA=0, primary coil current IL (513) is modulated to have a lower amplitude by reducing the size of switch MS (516) for a higher on-resistance (RON), limiting the current flow from supply voltage VLP (501) to primary coil LP (512). However, the voltage across switch MS (516) is non-zero in this case even when switch MS (516) is on. As a result, the power dissipation is higher than the optimal value achieved during the normal power transfer operation. Nevertheless, sending data to an implant may not occur frequently, depending on the application. A technique for data transfer utilizing the tank circuit is to supplement the switch MS (516) with a plurality of switches, wherein the number of switches in the plurality is controlled by or is a function of the digital DATA Input signal which may be modulated by ASK for data transfer.

Figure 7A:
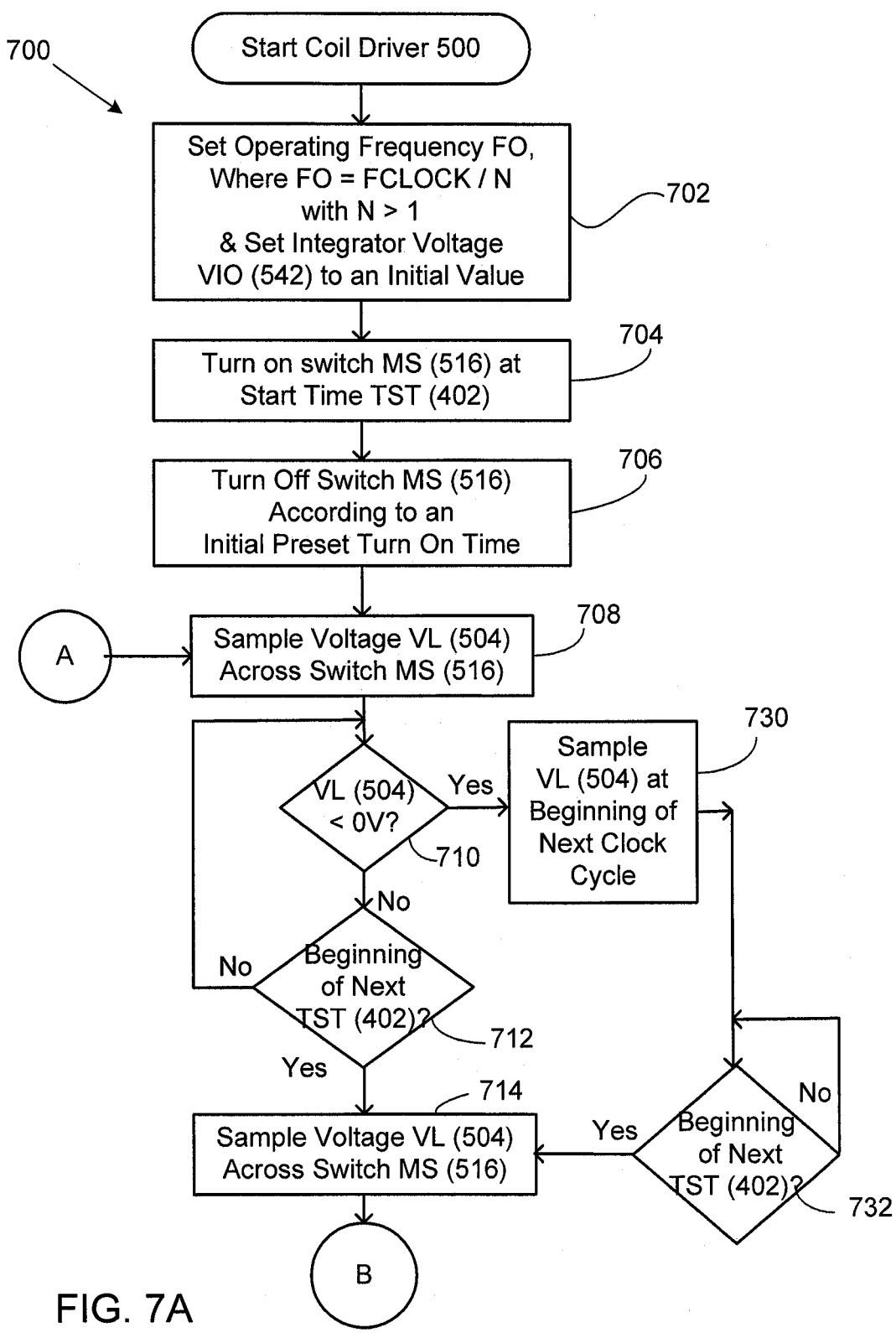
FIGS. 7A-7B is a flowchart showing a method for feedback control of a coil driver for inductive power transfer according to an embodiment of the present invention.
Figure 7B:
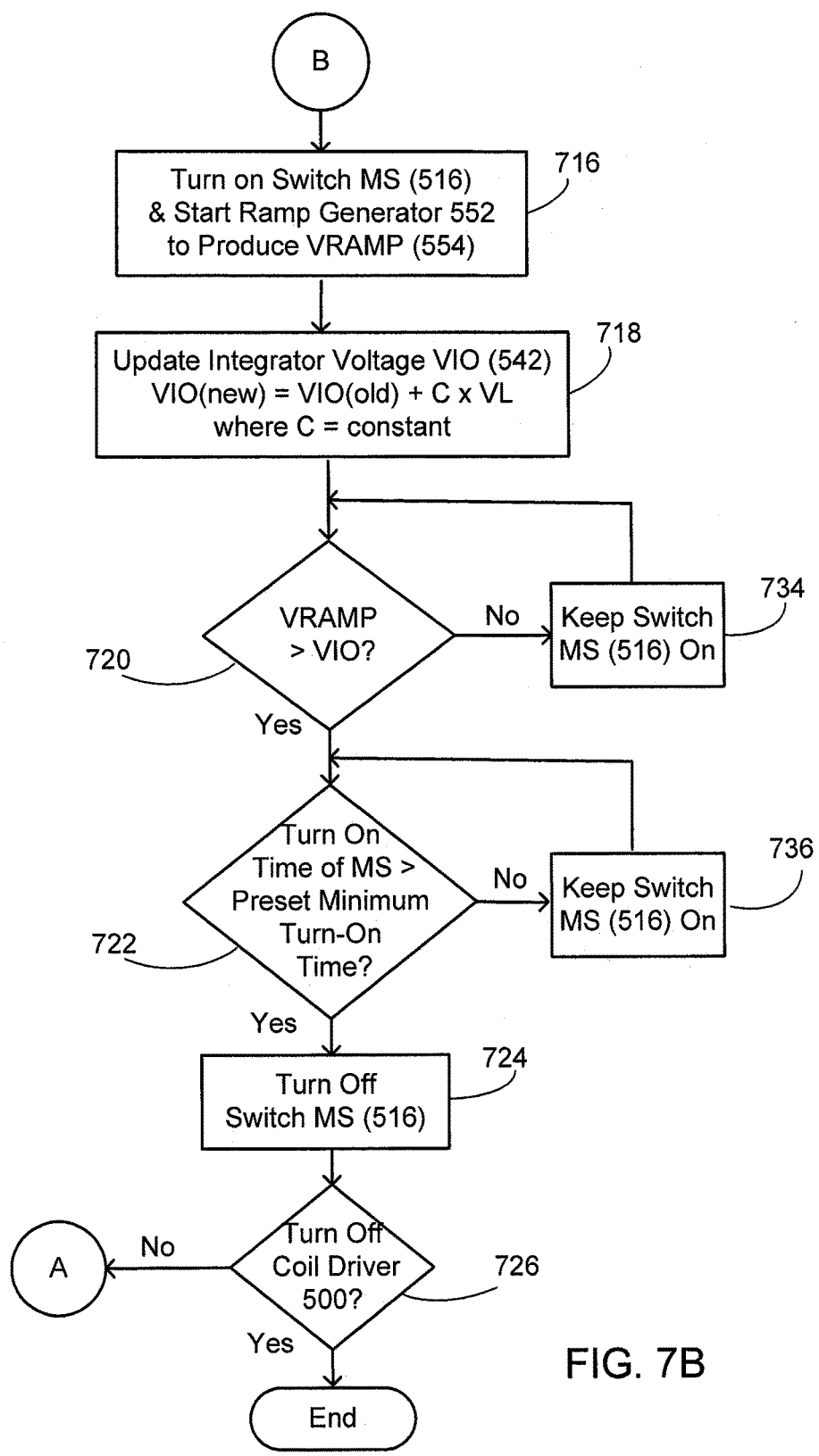

FIGS. 7A-7B is a flowchart 700 showing a method for feedback control of a coil driver, such as coil driver 500 in FIG. 5A, for inductive power transfer according to an embodiment of the present invention. In block 702, a repetitive pulse signal at the operating frequency FO is generated having a frequency of the CLOCK 520 divided by N. Accordingly, N pulses of the CLOCK 520 will occur between consecutive pulses of FO. Integrator voltage VIO (542) is set to an initial value. Flow proceeds to block 704, where switch MS (516) is turned on at turn on start time TST, which is the time at which the leading edge of switch voltage VSW (503) occurs. Switch voltage VSW (503) is the pulse signal generated in block 702. Flow proceeds to block 706.

In block 706, switch MS (516) is turned off according to an initial preset turn on time. Flow proceeds to block 708 where the feedback controlled coil driver protocol commences. In block 708, the coil driver output voltage VL (504) across switch MS (516) is sampled. Flow proceeds to block 710. In block 710, the voltage VL (504) is examined to determine whether it is less than 0 volts. If VL is equal to or greater than 0 volts, flow proceeds to block 712. If VL is less than 0 volts, flow proceeds to block 730.

In block 712, a test for the beginning of the next consecutive turn on start time TST occurs. If the next consecutive turn on start time TST has not occurred, then flow returns to block 710. Blocks 710 and 712 comprise a continuous or repetitive loop until the next turn on start time TST occurs.

In block 730, coil driver output voltage VL (504) is sampled at the beginning of the next CLOCK cycle. In other words, VL is sampled at the occurrence of the next pulse in the pulse train defining the CLOCK. No more than N CLOCK pulses will occur before a TST occurs. Flow proceeds to block 732, where a test for the beginning of the next turn on start time TST occurs. If the next turn on start time TST has not taken place, then flow returns to block 732. If the next turn on start time TST has occurred, then flow proceeds to block 714, where voltage VL (504) is sampled and flow proceeds to block 716.

In block 716, switch MS (516) is turned on, ramp generator 552 starts to generate VRAMP (554). Flow proceeds to block 718, where integrator voltage VIO (542) is updated based on the equation VIO (new)=VIO (old)+C×VL, where C is a constant. Flow proceeds to block 720.

In block 720, the output of ramp generator 552 VRAMP (554) is examined to determine whether it is greater than integrator voltage VIO. If VRAMP is less than or equal to VIO, then flow proceeds to block 734, where switch MS (516) is kept on and flow returns to block 720. If VRAMP is greater than VIO, then flow proceeds to block 722.

In block 722, the turn on time of switch MS (516) is tested to see if it is greater than a preset minimum turn on time. If the turn on time of switch MS (516) is not greater than the preset minimum turn on time, then flow proceeds to block 736, where switch MS (516) is kept on and flow proceeds back to block 722. If the turn on time of switch MS (516) is greater than a preset minimum turn on time, then flow proceeds to block 724, where switch MS (516) is turned off and flow proceeds to block 726. The blocks 722 and 724 are precautionary in nature to compensate for a situation when TON may be considered too short, as shown in FIG. 4D, for proper circuit operation. However, with comparator (532) and the associated circuits operating as contemplated, the on time TON will be adjusted correctly and blocks 722 and 724 may be eliminated.

In block 726, a test occurs to determine if coil driver 500 should be turned off. If coil driver 500 is to be turned off, then method 700 ends. If coil driver 500 is not to be turned off, then flow returns to block 708.

Figure 8:
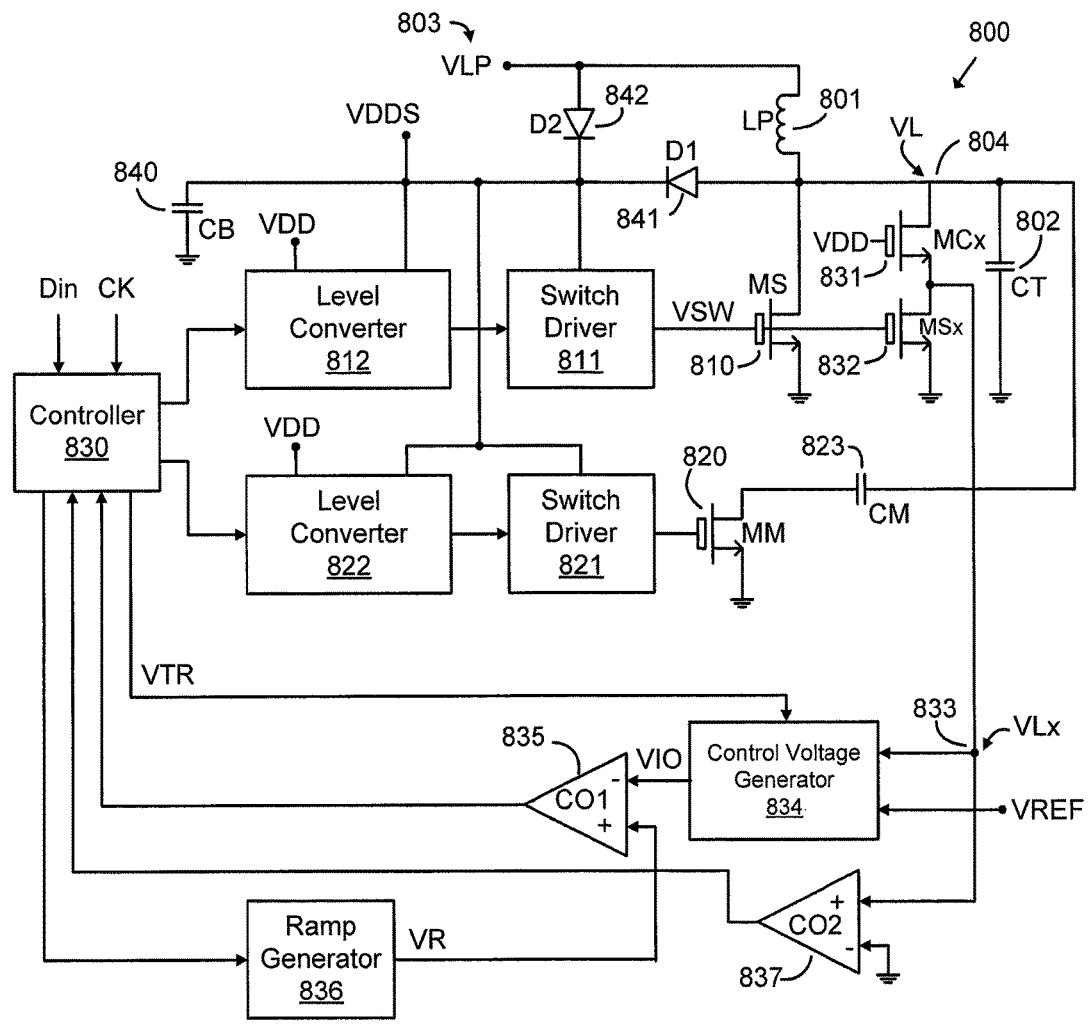
FIG. 8 is a block diagram of a feedback controlled coil driver according to an embodiment of the present invention.

FIG. 8 is a diagram of an exemplary circuit according to the invention. The circuit includes an LC tank circuit, coil driver elements, modulation elements, and feedback control elements.

The LC tank circuit 800 includes an inductor 801 and a capacitor 802. The inductor 801 is the driven coil which will generate the magnetic field used to power and communicate with the receiving coil. The capacitor 802 is coupled in series with the inductor 801 to form a resonant circuit. The resonant circuit is coupled at the inductor end to the power source VLP 803, and at the capacitor end to ground. The node between the inductor and the capacitor is the drive voltage node 804. The voltage at the drive voltage node 804, or the voltage across the capacitor 802, is the drive voltage VL.

The coil driver elements include the first level converter 812, the first switch driver 811, and the coil driver switch 810. The first level converter 812 receives a signal from the controller 830. The first level converter 812 applies a signal to the first switch driver 811. The first switch driver 811 applies a voltage to the gate of the coil driver switch 810 based on the signal received from the first level converter 812. The coil driver switch 810 couples and decouples the drive voltage node 804 from ground depending on the voltage received from the first switch driver 811.

The modulation elements include the second level converter 822, the second switch driver 821, the modulation switch 820, and the modulation capacitor 823. The second level converter 822 receives a signal from the controller 830. The signal received from the controller 830 can be the data signal Din or a signal responsive to Din. The second level converter 822 applies a signal to the second switch driver 821. The second switch driver 821 applies a voltage to the gate of the modulation switch 820. The modulation switch 820 couples and decouples the modulation capacitor 823 from ground depending on the voltage received from the second switch driver 821. The modulation capacitor 823 is coupled at one end to the modulation switch 820, and at the other end to the drive voltage node 804.

The feedback control elements include the first and second voltage-scaling transistors 831 and 832, the feedback controller, and the controller 830. The feedback controller includes the control voltage generator 834, the first and second comparators 835 and 837, and the ramp voltage generator 836. The first transistor 831 is connected in series with the second transistor 832. The node between the first transistor 831 and the second transistor 832 is the sampling node 833. The first transistor 831 couples the drive voltage node 804 to the sampling node 833. The second transistor 832 couples the sampling node 833 to ground. The gate of the first transistor 831 receives a supply voltage VDD. The gate of the second transistor 832 is coupled to the output of the first switch driver 811, such that the second transistor 832 and the coil driver switch 810 both receive the same drive signal.

The control voltage generator 834 receives the voltage at the sampling node 833 and a reference voltage as inputs, receives a signal VTR from the controller 830, and outputs an on time control voltage VIO. The ramp voltage generator 836 receives a start signal from the controller 830 and outputs a ramp voltage VR. The first comparator 835 receives VIO from the control voltage generator 834 and VR from the ramp voltage generator 836 as inputs and outputs a feedback control signal to the controller 830. The second comparator 837 receives the voltage at the sampling node 833 and ground as inputs and outputs to the controller 830. The controller 830 can be implemented as an ASIC digital circuit, a microprocessor, a microcontroller, or a state machine. The controller 830 can include one or more repetitive pulse signal generators. The pulse signal generators can have a controllable on time and can be used to generate the signal for controlling the coil driver switch 810 (VSW), signal VTR, or other signals.

FIG. 9A is a diagram of an exemplary implementation of the control voltage generator 834. The control voltage generator samples an input voltage and integrates the difference between the sampled voltage and a reference voltage to generate an on time control voltage VIO. An op amp 901 and capacitor 902 form the integrator. Transistors M1 (911) and M2 (912) are connected in series. Transistor M2 (912) receives a biasing voltage at its gate, and couples a supply voltage VDD to transistor M1 (911) and a first sampling switch 913. Transistor M1 (911) couples transistor M2 (912) and the first sampling switch 913 to ground. The voltage at the sampling node 833 is connected to the gate of transistor M1 (911). The first sampling switch 913 has signal φ1 applied to its gate and couples the first sampling capacitor 914 to the node between transistor M1 (911) and transistor M2 (912). The second sampling switch 915 has signal φ2 applied to its gate and couples the first sampling capacitor 914 to the negative input of the op amp 901.

Transistor M3 (921) and transistor M4 (922) are connected in series. Transistor M4 (922) receives the same biasing voltage at its gate as transistor M2 (912), and couples the same supply voltage VDD to transistor M3 (921) and a third sampling switch 923. Transistor M3 (921) couples transistor M4 (922) and the third sampling switch 923 to ground. A reference voltage—usually 0v—is applied to the gate of transistor M3 (922). The third sampling switch 923 has signal φ1 applied to its gate and couples the second sampling capacitor 924 to the node between transistor M3 (921) and transistor M4 (922). The fourth sampling switch 925 has signal φ2 applied to its gate and couples the second sampling capacitor 924 to the positive input of the op amp 901. The second sampling capacitor 924 is also connected directly to the positive input to the op amp 901, shorting the fourth sampling switch 925. The integrator outputs the voltage VIO mentioned above. This control voltage generator can be modeled as a simple discrete integrator with a transfer function given as $H(z)=K_I/(1-z^{-1})$.

FIG. 9B is a timing diagram of an exemplary embodiment of Signals φ1 and φ2. Signals φ1 and φ2 are generated from the signal received by the control voltage generator 834 from the controller 830. Signals φ1 and φ2 are never high at the same time; generally, one of the two is high, except for short grace periods 951 and 952 when switching. Signal φ1 goes low when VSW turns on the coil driver switch, or just before VSW turns on the coil driver switch (in a manner that samples the voltage before the voltage at the sampling node goes to 0). Signal φ2 goes high just after signal φ1 goes low. Signal φ2 stays high at least until the integrator settles; in embodiments, signal φ2 stays high until VSW turns off the coil driver switch. Signal φ1 goes high as soon as signal φ2 goes low. Signal φ1 must be high long enough for the voltage on the first sampling capacitor 914 to settle. The grace periods 951 and 952 shown in FIG. 9B are illustrative, and can be of a negligible duration.

When signal φ1 is high, a voltage indicative of the voltage at the sampling node is stored across the first sampling capacitor. When signal φ1 goes low, that voltage remains across the first sampling capacitor. Subsequently, when signal φ2 goes high, that sampled voltage that remains across the first sampling capacitor is applied to the integrator.

The LC tank circuit 800 and the coil driver elements of FIG. 8 function as a class E amplifier. VSW is the voltage from the first switch driver 811 applied to the gate of the coil driver switch 810. VSW closes the coil driver switch 810 at the desired frequency of the power transfer signal (the operation frequency, FO), then opens the switch 810 after an on time (TON). Closing the coil driver switch 810 causes VLP to build current, thereby storing power, in the inductor

801. Opening the coil driver switch 810 causes the LC tank circuit 800 to oscillate at its resonant frequency, producing a sinusoidal current through the inductor 801, until the coil driver switch 810 closes again. In this application, closing the coil driver switch, causing a supply voltage to build current in the inductor, is referred to as "coupling the LC tank circuit to ground." Similarly, opening the coil driver switch, causing the LC tank circuit to oscillate at its resonant frequency, is referred to as "decoupling the LC tank circuit from ground."

The modulation elements couple the modulation capacitor 823 into the LC tank circuit 800 to represent data. Connecting the modulation capacitor 823 in parallel with the LC tank capacitor 802 lowers the resonant frequency of the LC circuit, causing it to oscillate more slowly when the coil driver switch 810 is opened. This slower oscillation will change the optimal value TOP of TON, resulting in the situation shown in FIG. 4C.

The feedback control elements change the value of TON to dynamically match TOP. The first and second voltage-scaling transistors 831 and 832 create a scaled down version (VLx) of VL at the sampling node 833. The control voltage generator 834 samples VLx when the coil driver switch 810 closes to get VLS. VLx will transition to 0 once the coil driver switch 810 closes, so when this application refers to sampling VLx "when the coil driver switch closes" or equivalents, it means capturing the value of VL before it transitions to 0. The control voltage generator 834 then integrates the difference between VLS and a reference voltage—typically 0v—to get an on time control voltage VIO. The ramp voltage generator 836 outputs a ramp voltage VR that begins to rise when the coil driver switch 810 closes. The first comparator 835 compares VIO to VR, alerting the controller 830 when VR exceeds VIO. If TON is at its optimal value of TOP, depicted in FIG. 4A, VIO will be 0 so the first comparator 835 will tell the controller 830 to open the coil driver switch 810 at the same time. If TON is shorter than TOP, depicted in FIG. 4B, VLS will be negative so VR will pass VLS sooner so the comparator 835 will tell the controller 830 to open the coil driver switch 810 sooner. If TON is longer than TOP, depicted in FIG. 4C, VLS will be positive so VR will pass VLS later so the comparator 835 will tell the controller 830 to open the coil driver switch 810 later. The result is that TON is optimized each cycle based on the previous cycle.

Figure 10:
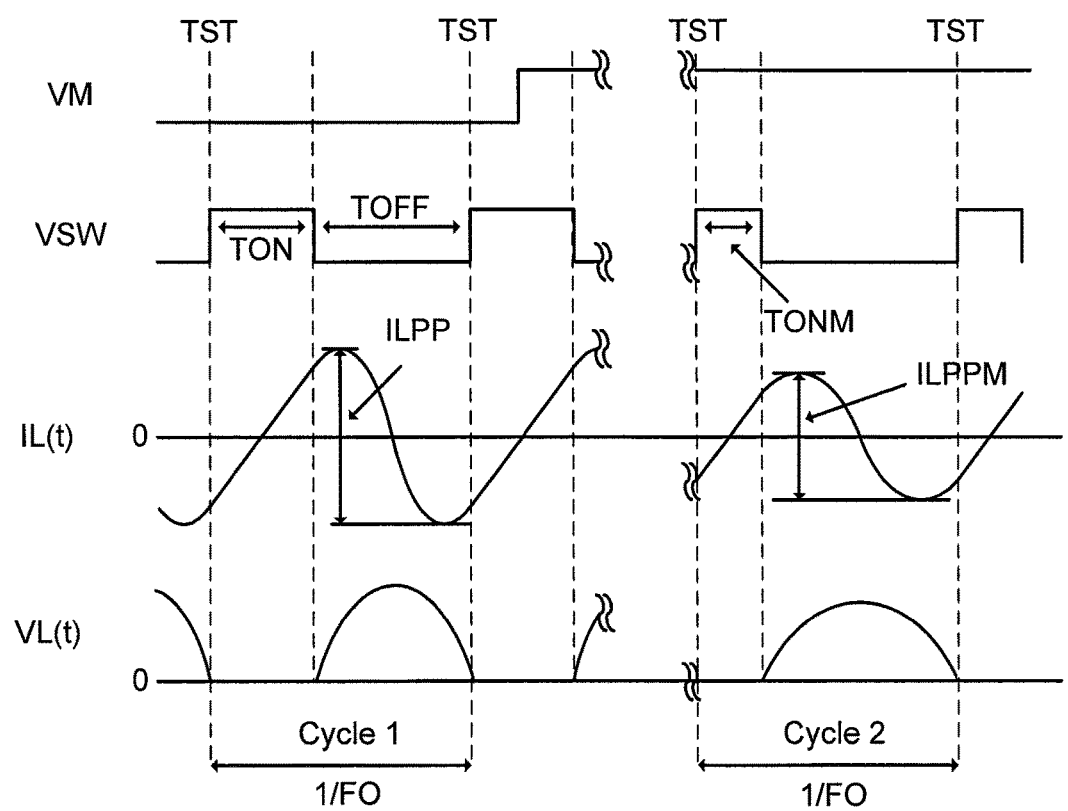
FIG. 10 is timing waveforms demonstrating operation of the circuit of FIG. 8.

As discussed above, the modulation elements represent data by coupling the modulation capacitor 823 into the LC tank circuit 800 which reduces the value of TOP. When this happens, the feedback control elements automatically reduce on time TON to match TOP. Although the LC tank circuit 800 oscillates more slowly, the corresponding reduced on time TON causes the resultant signal to have substantially the same frequency as when the modulation capacitor 823 is not coupled (the operating frequency FO). Because the LC tank circuit 800 is drawing power from the power supply for a shorter on time TON, the resultant signal has a smaller amplitude when the modulation capacitor 823 is coupled to the LC tank circuit 800. This operation is qualitatively illustrated in FIG. 10. VM is the voltage applied to the modulation switch 820. During cycle 1, the modulation capacitor 823 is not coupled to the LC tank circuit 800 and the system is operating with TON=TOP resulting in a peak-to-peak IL(t) of ILPP. Subsequently, VM goes high, coupling the modulation capacitor 823 into the LC tank circuit 800. The reduced resonant frequency causes IL(t) to oscillate more slowly. This corresponds to a new optimal on time, TOPM, which is shorter than the previous TOP. As a result, TON>TOPM. During cycle 2, the feedback control has compensated for the change, so the coil driver switch is closed for TONM=TOPM resulting in a peak-to-peak IL(t) of ILPPM. The cycle 1 signal and the cycle 2 signal have the same period, and therefore frequency, but the ILPPM of cycle 2 is lower than the ILPP of cycle 1 such that amplitude modulation on the coil current IL(t) is achieved. Reciprocal operation occurs when the modulation capacitor is decoupled from the LC tank, returning the circuit and its output signal to their pre-modulation states.

Figure 11:
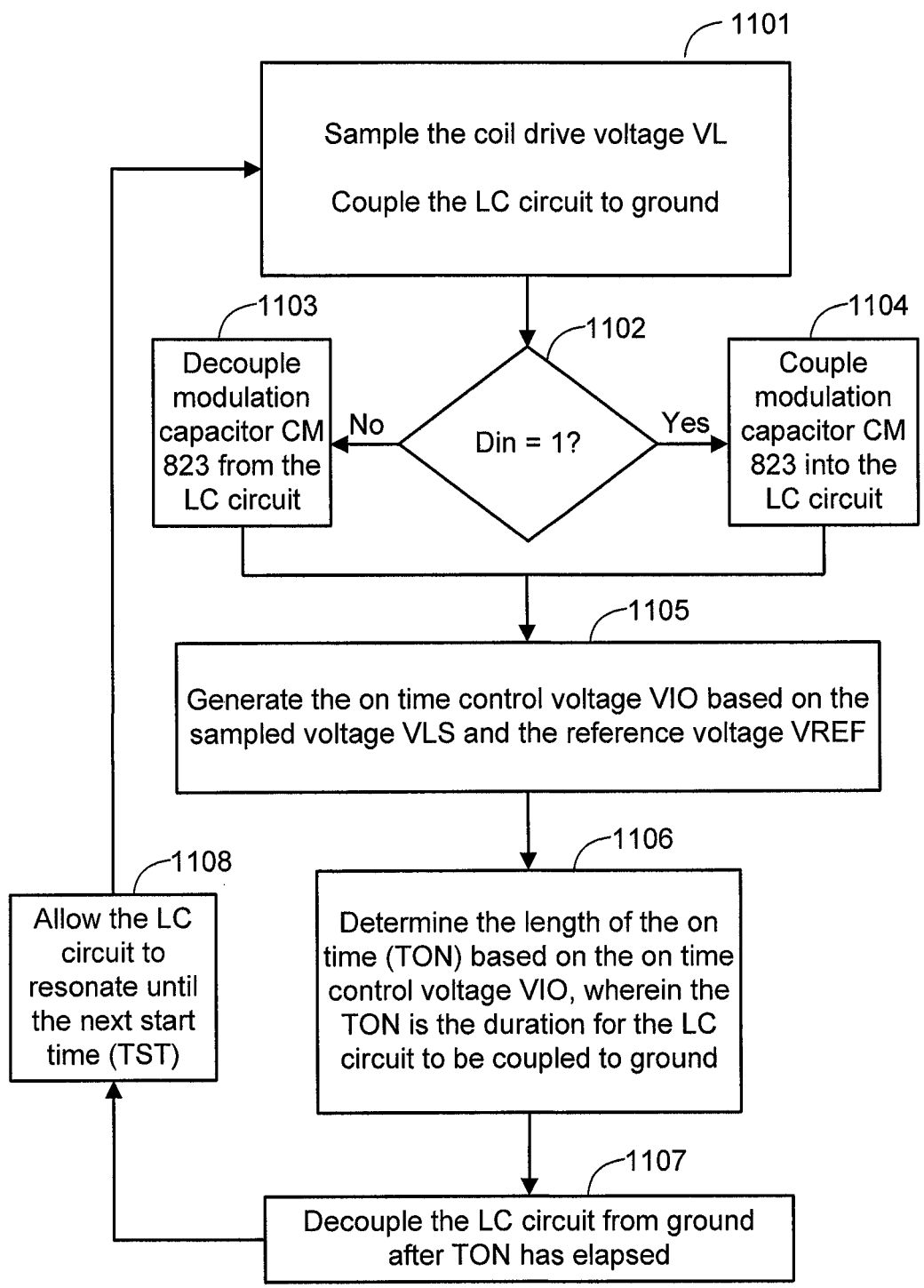
FIG. 11 is a flowchart showing a method of driving a coil driver and modulating the signal with data according to an embodiment of the present invention.

FIG. 11 is a flowchart showing a method of driving a coil driver and modulating the signal with data according to an embodiment of the present invention. In block 1101, the coil drive voltage is sampled and the LC tank circuit is coupled to ground. Subsequently, in block 1102, data signal Din is checked. If data signal Din is 1, the modulation capacitor is coupled into (or remains coupled into) the LC tank circuit in block 1104. If data signal Din is not 1, the modulation capacitor is decoupled from (or remains decoupled from) the LC tank circuit in block 1103. Flow proceeds to block 1105 where an on time control voltage is generated based on the voltage sampled in block 1101 and a reference voltage. In block 1106, an on time TON for the current cycle is found based on the on time control voltage. The on time TON is the duration which the LC circuit will be coupled to ground in the current cycle. In block 1107, the LC circuit is decoupled from ground after TON has elapsed. In block 1108, the LC circuit is allowed to resonate until the next TST arrives.

The circuit of FIG. 8 also includes on resistance reduction elements. The on resistance reduction elements include a first diode 841, a second diode 842, and capacitor CB 840. The first diode 841 couples the drive voltage node 804 to capacitor CB 840. The second diode 842 couples the power supply VLP 803 to capacitor CB 840. The voltage across capacitor CB 840 is VDDS. VDDS is coupled to the first level converter 812, the second level converter 822, the first switch driver 811, and the second switch driver 821.

Applying a higher gate drive voltage to the coil driver switch 810 or the modulation switch 820 reduces the switch's on resistance. The peak voltage at the drive voltage node 804 is higher than the supply voltages in the circuit. The first diode 841 rectifies the voltage at the drive voltage node 804 to generate a high VDDS on capacitor CB 840. VDDS is then used as a gate drive voltage for the coil driver switch 810 and the modulation switch 820. The second diode 842 guarantees a minimum supply voltage for VDDS to be used for initial startup.

Although the preceding description describes various embodiments of the system, the invention is not limited to such embodiments, but rather covers all modifications, alternatives, and equivalents that fall within the spirit and scope of the invention. Since many embodiments of the invention can be made without departing from the spirit and scope of the invention, the invention resides in the claims hereinafter appended.

What is claimed is:

1. A feedback controlled coil driver capable of amplitude modulation comprising:
    an LC tank circuit;
    a direct current power source coupled to the LC tank circuit;
    a first switch interconnected between the LC tank circuit and ground to switchably couple the LC tank circuit between the power source and ground when the first switch is turned on, wherein the point of interconnection between the LC tank circuit and the first switch provides a coil driver output voltage VL;

a control voltage generator configured to sample VL at the instant when the first switch is turned on and generate a voltage VIO equal to the integral over time of the difference between the sampled VL and a prescribed reference voltage;

a voltage ramp generator arranged to provide a ramp voltage at such time when the first switch couples the LC tank circuit to ground;

a first comparator arranged to compare VIO to the ramp voltage;

a first switch driver coupled to the first comparator, the first switch driver being arranged to turn the first switch on at an operating frequency and arranged to turn the first switch off when the ramp voltage exceeds VIO;

a modulation capacitor;

a second switch coupled to the modulation capacitor and configured to couple the modulation capacitor into and out of the LC tank circuit; and a second switch driver coupled to a data signal and arranged to turn the second switch on and off based on the data signal.

2. The feedback controlled coil driver of claim 1 wherein the voltage ramp generator commences generating a ramp voltage at the instant when the first switch is turned on.

3. The feedback controlled coil driver of claim 2 further comprising a controller coupled to the first switch driver and configured to provide a repetitive pulse signal at a first prescribed frequency (FO), wherein the pulses each have a turn on start time (TST) and wherein the first switch driver causes the first switch to turn on at each consecutive TST.

4. The feedback controlled coil driver of claim 3 wherein the prescribed reference voltage is zero volts.

5. The feedback controlled coil driver of claim 3 further comprising a second comparator arranged to compare the VL to ground and configured to cause the sampling circuit to sample the VL when the VL is less than ground.

6. The feedback controlled coil driver of claim 5 wherein the controller is configured to provide a second repetitive pulse signal at a second prescribed frequency being greater than the first prescribed frequency and wherein the second comparator circuit causes the sampling circuit to sample the VL at the occurrence of a selected pulse in the second repetitive pulse signal.

7. The feedback controlled coil driver of claim 6 wherein the selected pulse is defined between consecutive TST's at the instant when the VL is less than zero.

8. The feedback controlled coil driver of claim 1 wherein the second switch is interconnected between the modulation capacitor and ground.

9. A method of driving a coil in an LC circuit to generate an amplitude modulated signal comprising the steps of:
coupling an LC tank circuit to ground at controlled times, the LC tank circuit being configured to generate a coil drive voltage (VL) and having a resonant frequency;
monitoring the VL to generate an on time control voltage (VIO);
decoupling the LC tank circuit from ground after an on time, wherein the on time is based on the on time control voltage; and
changing the resonant frequency of the LC tank circuit to modulate data onto the coil drive voltage.

10. The method of claim 9 wherein decoupling the LC tank circuit after an on time, wherein the on time is based on the on time control voltage comprises:
providing a ramp voltage commencing when the LC tank circuit is coupled between the power source and ground; and
decoupling the LC tank circuit from ground when the ramp voltage exceeds the on time control voltage.

11. The method of claim 10 further comprising the step of providing a first repetitive pulse signal at a first frequency (FO), wherein the pulses each have a turn on start time (TST) and a pulse duration TON.

12. The method of claim 11 wherein coupling the LC tank circuit between a power source and ground at controlled times comprises connecting the LC tank circuit to ground at each consecutive TST.

13. The method of claim 9 wherein the step of monitoring comprises sampling the VL at the instant when the LC tank circuit is connected to ground.

14. The method of claim 13 wherein generating an on time control voltage comprises integrating the difference between the sampled VL and a preselected reference voltage.

15. The method of claim 12 further comprising the steps of:
providing a second repetitive pulse signal having a frequency greater than the frequency of the first repetitive pulse signal; and
sampling the VL during a pulse in the second repetitive pulse signal occurring between consecutive TST's at an instant when VL is less than zero.

16. The method of claim 9 wherein changing the resonant frequency of the LC tank circuit comprises coupling a modulation capacitor to the LC tank circuit.

17. A feedback controlled coil driver circuit comprising:
an LC tank circuit having a coil drive voltage;
a first switch configured to switchably couple the LC tank circuit between a power source and ground;
a controller coupled to the first switch, a pulse signal generated by the controller, having a controllable on time, wherein during such on time, the first switch couples the LC tank circuit between the power source and ground;
a feedback controller configured to provide a feedback control signal to control the on time of the pulse signal;
a modulation capacitor coupled to the LC tank circuit;
a second switch interconnected between the modulation capacitor and ground, wherein the second switch couples the modulation capacitor to the LC tank circuit based on a data signal.

18. The coil driver circuit of claim 17, wherein the feedback controller comprises:
a sampling circuit configured to sample the value of the coil drive voltage at the instant when the first switch is turned on; and
an integrator circuit configured to integrate the difference between the sampled coil drive voltage and a preselected reference voltage to thereby provide an on time control voltage.

19. The coil driver circuit of claim 18, wherein the feedback controller further comprises:
a voltage ramp generator arranged to commence providing a ramp voltage when the first switch is turned on; and
a first comparator arranged to compare the on time control voltage and the ramp voltage for providing the feedback control signal and wherein the feedback control signal influences the pulse signal on time to cause the LC tank circuit to be decoupled between the power source and ground when the ramp voltage exceeds the on time control voltage.

20. The coil driver circuit of claim 19, wherein the feedback controller further comprises a second comparator arranged to compare the coil drive voltage to ground and configured to cause the sampling circuit to sample the coil drive voltage when the coil drive voltage is less than ground.

21. The coil driver circuit of claim 20, wherein the reference voltage is zero volts.

22. A method of generating a modulated signal comprising:
   driving an LC circuit at an operating frequency, the LC circuit having a coil drive voltage; and
   coupling a modulation capacitor to the LC circuit to modulate the amplitude of the coil drive voltage.

23. The method of claim 22 wherein driving an LC circuit comprises:
   coupling an LC circuit to ground at the operating frequency;
   comparing the drive voltage and a reference voltage to get an on time control voltage; and
   decoupling the LC circuit from ground after an on time, the on time being based on the on time control voltage.

24. The method of claim 23 wherein comparing the drive voltage and a reference voltage to get an on time control voltage comprises:
   sampling the coil drive voltage upon coupling the LC circuit to ground; and
   integrating the difference between the sampled voltage and the reference voltage.

25. The method of claim 23 wherein comparing the drive voltage and a reference voltage to get an on time control voltage comprises:
   sampling a scaled voltage upon coupling the LC circuit to ground, the scaled voltage being proportional to the coil drive voltage; and
   integrating the difference between the sampled voltage and the reference voltage.

26. The method of claim 23 wherein decoupling the LC circuit from ground after an on time, the on time being based on the on time control voltage comprises:
   providing a ramp voltage, the ramp voltage beginning to increase upon coupling the LC circuit to ground; and
   decoupling the LC circuit from ground when the ramp voltage reaches the on time control voltage.

27. The method of claim 22 wherein driving the LC circuit at the operating frequency comprises driving the LC circuit at substantially the same frequency when the modulation capacitor is coupled to the LC circuit and when the modulation capacitor is not coupled to the LC circuit.

28. A method of modulating a signal in a power transfer system, the power transfer system comprising an LC circuit and having an operating frequency, and the LC circuit having a coil drive voltage and a resonant frequency, the method comprising:
   changing the resonant frequency of the LC circuit; and
   controlling the driving of the LC circuit to keep the circuit oscillating at the operating frequency.

29. The method of claim 28 wherein controlling the driving of the LC circuit to keep the circuit oscillating at the driving frequency comprises:
   coupling the LC circuit to ground at the operating frequency;
   sampling the coil drive voltage upon coupling the LC circuit to ground;
   integrating the difference between the sampled voltage and a reference voltage to get an on time control voltage; and
   decoupling the LC circuit from ground after a duration based on the on time control voltage.

30. The method of claim 29 wherein decoupling the LC circuit from ground after a duration based on the on time control voltage comprises:
   providing a ramp voltage, the ramp voltage beginning to increase upon coupling the LC circuit to ground; and
   decoupling the LC circuit from ground when the ramp voltage reaches the on time control voltage.

31. The method of claim 28 wherein changing the resonant frequency of the LC circuit comprises coupling a modulation capacitor to the LC circuit.

* * * * *